UNITED STATES PATENT OFFICE.

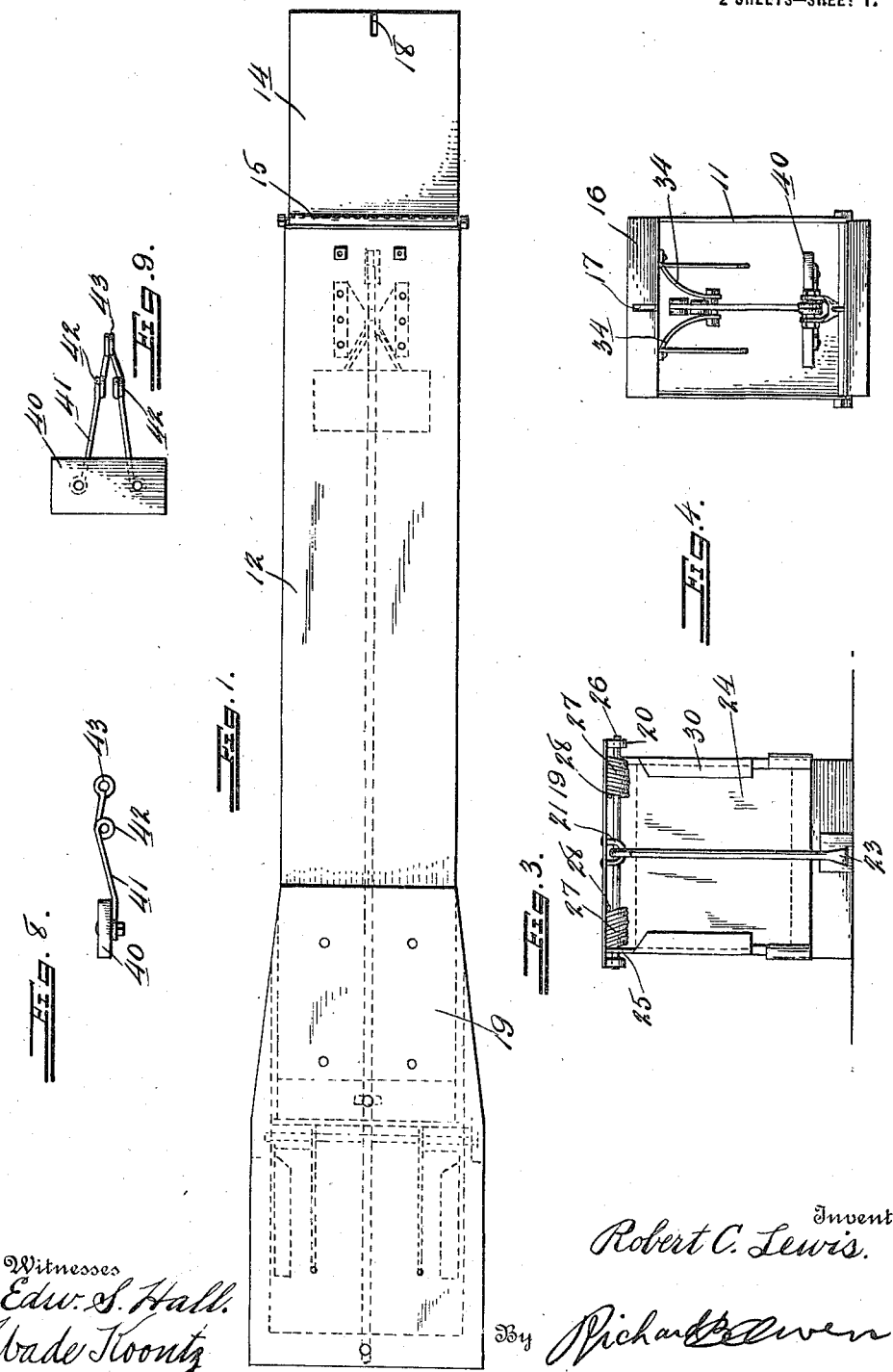

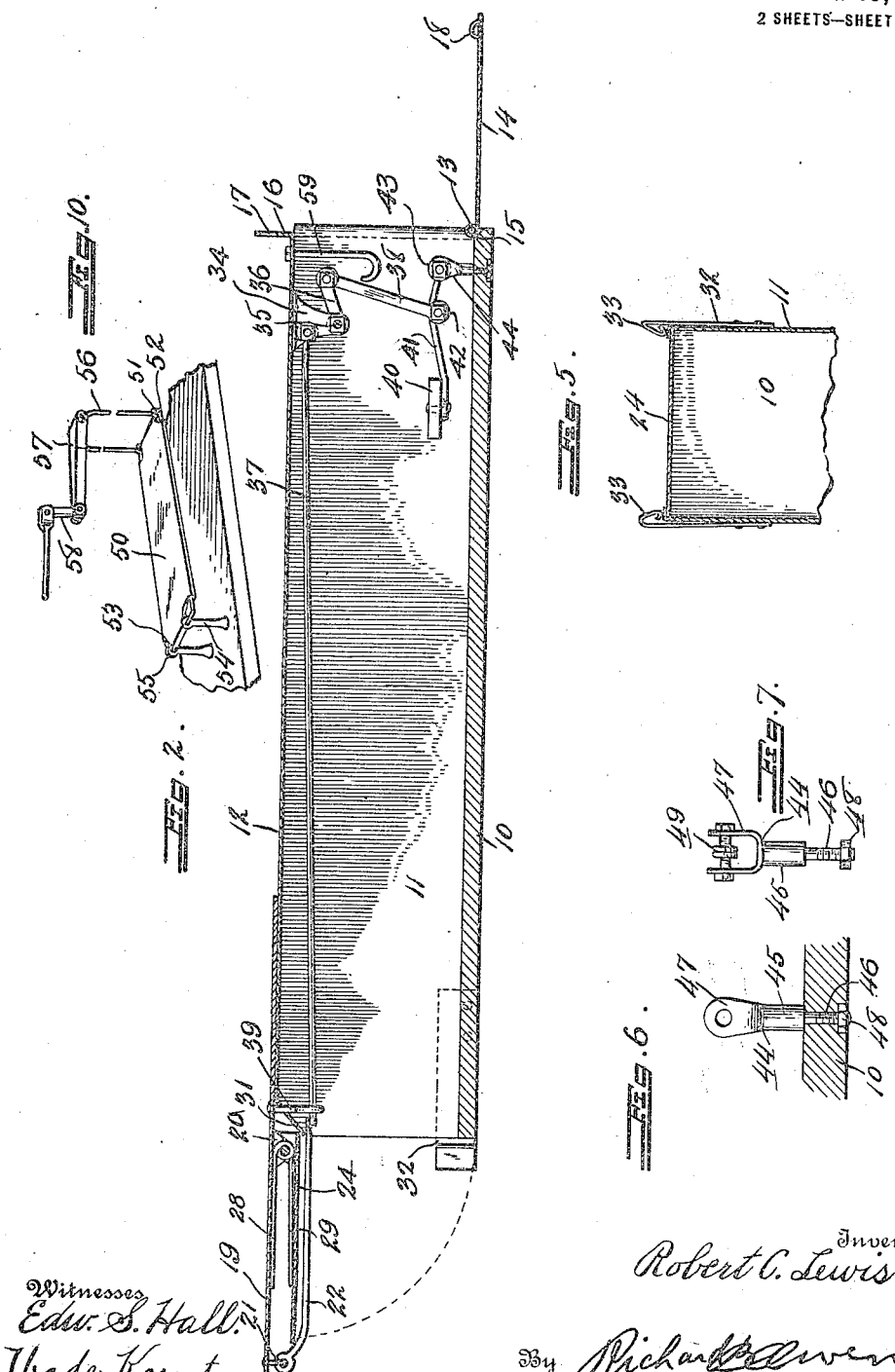

ROBERT C. LEWIS, OF MEDICAL LAKE, WASHINGTON.

ANIMAL-TRAP.

1,283,232.  Specification of Letters Patent.  Patented Oct. 29, 1918.

Application filed December 28, 1914. Serial No. 879,356.

*To all whom it may concern:*

Be it known that I, ROBERT C. LEWIS, a citizen of the United States, residing at Medical Lake, in the county of Spokane and State of Washington, have invented certain new and useful Improvements in Animal-Traps, of which the following is a specification.

This invention relates to animal traps, and the object of the same is to provide a device that will entrap animals, and is especially adapted for use in the trapping of minks for breeding purposes.

Another object of this invention is the production of a trap that will perform the functions above stated that is so constructed that the said trap can be quickly and efficiently baited with absolutely no danger of the person baiting the same being in any way accidentally "caught" by the trap.

A still further object of this invention is to provide a trap that is especially adapted for use in very cold regions, and is so constructed as to obviate any likelihood of the animal caught therein from being frozen to death as is the case in many of the traps now in use.

A still further object of this invention resides in the provision of an animal trap of the kind above set forth, that is simple in construction, efficient in operation, consists of the minimum number of parts and therefore can be manufactured and placed upon the market at the minimum cost.

With these and other objects in view, this invention consists of certain novel constructions, combinations and arrangement of parts, as will be hereinafter fully described and claimed.

In the accompanying drawings:—

Figure 1 is a top plan view of the improved device with the door adjacent the bait hooks thereof shown in an open position.

Fig. 2 is a longitudinal sectional view taken through the device as shown in Fig. 1.

Fig. 3 is a view in end elevation of the trap with a block placed thereunder to raise one end of the same from the ground to prevent the door and door retaining trigger from engaging the ground when the door is moved to a closed position.

Fig. 4 is an end elevation of the opposite end of the device from that as shown in Fig. 3 with the door open.

Fig. 5 is a section taken through the front and side walls of the device, showing the manner in which the spring clamps secured to the side walls engage the door in a closed position.

Fig. 6 is an enlarged sectional view taken through the base of this device showing the means for supporting the tripping platform thereto.

Fig. 7 is a view in front elevation of the tripping platform supporting means.

Fig. 8 is a view in side elevation of the improved tripping platform.

Fig. 9 is a top plan view of the device as shown in Fig. 8.

Fig. 10 is a perspective view of a modified form of tripping means.

Referring to the parts by reference numerals, 10 designates the base of this trap, and is made preferably of cypress wood or any heat insulating material. Secured to this base 10 is a hood comprising side walls 11 and a top 12, made preferably of sheet metal. Passing through alined openings in the side walls 11 adjacent the rear end of the base 10 is a pintle pin 13. A door or closure 14 is formed of sheet metal, and has at one end thereof a rolled hinge ear 15, through which the pintle 13 also passes, and thus the said door 14 is hingedly secured to the side walls 11 of the device. Formed on the top 12 of the hood is an upwardly directed flange 16 having an opening 17 formed therein intermediate the length thereof, and carried by the door 14 adjacent the opposite end thereof from that of the formation of the hinge ear 15 and disposed centrally of the width of said door, is a retaining loop 18 that is adapted to be positioned in the opening 17 when the said door 14 is in a closed position. After the loop 18 is passed through the opening 17 as before set forth any desired means can be positioned within the loop that will engage the flange 16 so as to lock the door 14 in a closed position.

Secured to the top 12 of the hood of this device adjacent the opposite end thereof from the formation of the flange 16, is a shield 19 that extends for a relatively great distance beyond the end of the hood and base 10, and formed on the underface of the shield 19 adjacent the end of the housing of the device, are hanger brackets 20 that have alined openings formed therein, and adjacent the forward extremity of this shield 19 is carried a staple 21 that in turn carries a trigger 22 which has an enlarged flattened end 23, the purpose of which will be hereinafter set forth. A door 24 is provided with extending ears 25 at the upper ends thereof, said ears 25 being provided with alined openings, and said openings are adapted to be alined with the openings formed in the hanger brackets 20 of the shield 19, and passing through said openings is a rod or shaft 26 that, as is obvious, hinges the said door 24 to the shield 19. A pair of coil springs 27 are wound about this rod 26 adjacent the ears 25 of the door 24, and one end of the wire from which these coil springs 27 are formed is positioned adjacent the underface of the shield 19 and is designated by the numeral 28, the opposite end of said wire is positioned against the door 24 and is designated by the numeral 29, the edge of the door being bent upon itself so as to form retaining flaps 30, under which these ends 29 are positioned and therefore the spring is rigidly connected to the door 24. This spring is of such a nature as to normally exert a pressure upon the door 24 to keep the same in a closed position, as is shown in Fig. 3. The top 12 of the housing of this device is bent at an angle thereto as at 31 so as to allow for the free movement of this door, and when the door is in a closed position there is provided with this device a pair of spring strips 32 carried by the device adjacent the bottom thereof, and the said strips 32 are bent upon themselves at one extremity thereof to form door-engaging portions 33, the said engaging portions 33 being of such a construction as to efficiently allow the door to be closed but to effectually prevent the opening of the same without the removal of the portions from engagement with the door.

Adjacent the rear end of the device and secured to the underface of the cover 12, are a pair of brackets 34 that are positioned in spaced relation, and each of the said brackets are provided with an opening adjacent the lower extremity thereof and the said openings are positioned in alinement to receive the bolt 35 that pivotally carries the bell crank lever 36. Attached at one end of this bell crank lever by suitable means is the tripping rod 37 and at the other end thereof is a connecting link 38. This tripping rod 37 is positioned adjacent the underface of the top 12, and passes through the eye 39 adjacent the forward end of the device, the said eye being secured to the guard 19 and passes through the angularly bent portion 31 of the top 12. A means whereby the bell crank lever 36 and the rod 37 are operated through the medium of the link 38 is provided, and the same comprises a platform 40 having secured thereto a wire supported frame 41, the said frame being bent so as to form parallel spaced eyes 42, and at the opposite extremity of the same from that of its attachment with the platform 40 a single eye 43 is formed. The opposite end of the link 38 from that of its connection with the bell crank lever 36 is positioned between the eyes 42, and suitable means is passed through an opening formed in the link 38 and the eyes 42 whereby the said link is pivotally connected to the frame 41. A bolt member 44 is provided with this device, and the same comprises a body 45 having at one end thereof a reduced threaded portion 46 and at the opposite end thereof a substantially U-shaped end 47 that is provided with alined openings. This bolt member 44 is positioned in the bottom 10 of the device adjacent the rear end thereof and the reduced threaded portion 46 of the same passes through the bottom 10, and a nut 48 is threaded thereon and countersunk in the inner face of the bottom 10. It will therefore be seen that the shoulder formed by the body portion 45 and the reduced portion 46 rests on the upper face of the bottom 10, and therefore in a material manner substantiates the securement of the bolt device 44 to the bottom 10. Suitable means 49 is passed through the eye 43 and the alined openings formed in the U-shaped end 47 of the bolt member so that the frame 41 is pivotally carried by this bolt member 44.

There is shown in Fig. 10 a modified form of tripping means for this device, the same comprising a substantially rectangular platform 50 made preferably of sheet metal, and the edges of the same are rolled as at 51, and a wire frame 52 is seated in this rolled portion 51 of the device. At the corners of the rectangular platform 50, the same is cutaway as at 53, and one end thereof is in engagement with the wire adjacent the cut-out portions 53. The said device is pivotally mounted to the members 54, the said members being substantially of the same construction as the bolt members 44 only that the same terminate in an eye portion 55 instead of in a substantially U-shaped end 47, as is shown in Figs. 6 and 7. At the opposite end of this platform 50 and secured to the wire frame 51 adjacent the cut-out portion of the platform 50, are connecting wires 56, the same being secured to a portion 57 of the bell crank lever 58. This bell crank lever, as is clearly seen in the accompanying drawings, is in all respects similar to the bell crank lever 36 used with the other form of tripping means but has a portion 57 thereof substantially V-shaped, and, as heretofore set forth, the connecting wires 56 are attached to an opening formed in this substantially V-shaped portion 57 of the bell crank lever 58. A pair of bait hooks 59 are secured to the top 12 adjacent the flange 16 and the same are positioned on either side of the wires 56 or the link 38 as the case may be. It is of course obvious that in trying to reach bait placed on the hooks 59, the animal will tread upon the platform 40 or 50 as the case may be, and move the bell crank lever and the rod 37.

The operation of this device is as follows. After the bait has been placed upon the hooks 59, the same being easily done, and inasmuch as when the door 14 is open access can readily be had thereto and furthermore while the bait is being placed on the same, there is absolutely no likelihood of the hand of the person placing the bait on the hook 59 being struck by any spring actuated portion of the device. After the bait has thus been placed, the door 14 is closed, the loop 18 passing through the slot 17 in the flange 16, and suitable means pass through the loop so as to efficiently retain the top in a closed position. The door 24 is then positioned as shown in Fig. 1, and the trigger 22 is placed under the door, and the enlarged flattened portion 23 of said trigger is placed upon the end of the rod 37, and thus the door is held in an open position and can only be closed by removing the trigger 22 from the position thus described. As heretofore set forth, when the animal treads upon either of the platforms 40 or 50, as the case may be, the rod 37 is moved and the trigger 22 becomes disengaged therefrom, and by means of the springs 27, the door 24 is moved quickly to a closed position and is efficiently retained in that postion by means of the spring catches 32. In that this device is preferably adapted for use in catching fur-bearing animals, the same will necessarily be used in very cold climates, and once an animal is caught in the same, there is no likelihood of the animal freezing to death because the base 10 is made of heat insulating material and the shield 19 efficiently prevents snow from entering in the device when the trap is in a set position, or, in other words, when the door 24 is opened. It has been found, by putting the device to practical use, that it is desirable to place the same on a block of wood or have the forward end thereof slightly elevated so there will be absolutely no likelihood of the trigger 22 striking the ground and thus preventing the door 24 from closing.

It is obvious that minor changes may be made in the form and construction of this invention without departing from the material parts thereof. It is therefore not wished to confine the invention to the exact form herein shown and described, but it is wished to include all such as properly come within the scope claimed.

I claim—

1. In an animal trap comprising an elongated box, a door at one end of said box, a shield on said box and extending beyond the end thereof adjacent the connection of said door with said box, a spring carried by said shield and engaging said door for normally retaining said door in a closed position, a trigger pivotally secured to said shield and adapted to engage said door to hold the same in an open position, a tripping rod engaging said trigger, and means for operating said tripping rod whereby said trigger is disengaged from said door and said door will be automatically returned to a closed position.

2. In an animal trap including a casing, a door at one end thereof, the same normally in a closed position, a trigger having a flattened end pivotally carried by said casing adjacent one end thereof and extending inwardly of said casing and in engagement with said door to retain the same in an open position and movable means in said casing in engagement with the flattened end of said trigger and means in said casing for moving said first mentioned means out of engagement with said trigger, as and for the purpose set forth.

3. In an animal trap including a casing having a spring actuated door, a means for controlling the movement of said door including a link, a bolt having a bifurcated end carried in said casing, a wire frame pivotally carried by said bolt and having alined eyes formed thereon, means passing through said alined eyes and in connection with said link to pivotally connect said frame with said link and a platform at the opposite end of said frame from that of its connection with said bolt, as and for the purpose set forth.

In testimony whereof I affix my signature in presence of two witnesses.

ROBERT C. LEWIS.

Witnesses:
F. N. KIRCHHOFFER,
HERBERT SCHOLER.

Copies of this patent may be obtained for five cents each, by addressing the "Commissioner of Patents, Washington, D. C."